United States Patent [19] [11] 4,120,146
Robin [45] Oct. 17, 1978

[54] STRINGS FORMED AT LEAST PARTIALLY OF SYNTHETIC MATERIAL

[76] Inventor: Jacques André Robin, 125 boulevard Malesherbes, Paris, France

[21] Appl. No.: 810,881

[22] Filed: Jun. 28, 1977

[30] Foreign Application Priority Data

Jun. 29, 1976 [FR] France .............................. 76 19684
May 31, 1977 [FR] France .............................. 77 16536

[51] Int. Cl.² .......................... D02G 3/36; D02G 3/40
[52] U.S. Cl. .......................................... 57/162; 57/35; 57/140 C; 57/164
[58] Field of Search ............... 57/35, 140 R, 140 C, 57/149, 153, 156, 162, 164, 34 HS

[56] References Cited

U.S. PATENT DOCUMENTS

| 3,050,431 | 8/1962 | Crandall | 57/157 R |
| 3,323,975 | 6/1967 | Marzocchi et al. | 57/140 C X |
| 3,624,999 | 12/1971 | Young | 57/153 |
| 3,738,096 | 6/1973 | Crandall | 57/149 |
| 3,739,567 | 6/1973 | Williamson | 57/140 C |
| 3,745,756 | 7/1973 | Crandall | 57/162 X |
| 4,034,138 | 7/1977 | Babayan | 57/140 C X |

*Primary Examiner*—Donald Watkins
*Attorney, Agent, or Firm*—Merriam, Marshall & Bicknell

[57] ABSTRACT

Strings constituted at least in part of synthetic material are described made of a bundle of multifilaments selected from the class consisting of natural and synthetic filaments which is impregnated with a thermosettable adhesive, with the multifilaments in non twisted condition, the adhesive is allowed to polymerize partly, the string is twisted and polymerization is then completed. Such strings are of particular value in stringing tennis rackets.

14 Claims, No Drawings

STRINGS FORMED AT LEAST PARTIALLY OF SYNTHETIC MATERIAL

The present invention relates to strings formed at least partially of synthetic material and the process of manufacturing them.

Strings of this type are already known which are used for various purposes, of which stringing musical instruments, rackets, particularly for tennis, squash, badminton etc, bows and cross-bows are non-limitative examples. For all these applications the strings in question should have specific characteristics of resistance to pulling and to elongation under a brief constraint or under repeated constraints; in these latter conditions, they should rapidly and totally take up their initial length again; finally, they should have good properties of resistance to different conditions of use, notably abrasion resistance, resistance to creasing or kinking, resistance to various atmospheric factors as well as to the various constraints to which they are subjected during their assembly on the supports to which they are to be fixed.

Strings of animal gut have been used for a very long time for example for stringing musical instruments and competition tennis rackets. Their elastic return characteristics (rapid and total return to the initial length after a brief constraint or repeated constraints) are excellent. Their elongation curves as a function of the applied traction are rectilinear and hardly vary from one elongation cycle to the next, which indicates the absence of flow. Each of the said curves has however steps each one corresponding to the breakage of certain of the elementary filaments constituting the corresponding string or again to the loss of adhesion of certain of the helices of this string, which is twisted. These latter phenomena however limit the service life of animal gut strings. Their service life being substantially proportional to their diameter, it is however not possible to increase the latter, since various disadvantages would result therefrom, notably relative to the elongation of the string subjected to traction. On the other hand, these animal gut strings do not have constant qualities, since these depend on the origin of the gut used as well as the conditions of storage of the strings and the humidity conditions prevailing at the moment of their use. Finally, taking account of the extension of the market for the strings in question, it has become almost impossible to continue to produce animal gut strings having the same traditional high degree of quality at a price remaining competitive with that of other strings which have more recently appeared on the market.

More recently in effect there have been used for the uses noted on the one hand metallic strings which have certain disadvantages and on the other hand different types of string constituted at least partially of synthetic material, particularly thermoplastic materials, notably;

1. strings each formed by an extruded monofilament of thermoplastic material, for example of polyamide, modified polyvinyl, polyurethane or thermoplastic polyester; the manufacture of these strings is economic; they have good resistance to wear; however, the monofilament which constitutes each string, when it it subjected to relatively weak traction, has a relatively slow elastic return and when it is subjected to a higher traction an irreversible elongation; the extruded monofilaments additionally become fragile at low temperatures;

2. strings each formed by a bundle of multifilaments parallel one to another this bundle not being impregnated at its heart but only surrounded exteriorly in its entirety by an extruded sheet of thermoplastic material; strings thus made however have a poor resistance to creasing and kinking and to wear, as a result of the poor resistance to abrasion of their thin sheath;

3. strings each constituted by a flat bundle of multifilaments parallel one to another and impregnated by extrusion with a thermoplastics material such as a polyamide, the strip or ribbon thus obtained being then twisted while hot; the helices so formed however have the disadvantage of becoming unadhered to one another when the string is subjected to traction;

4. strings which by their structure enhance several of the preceding types, for example, strings each constituted by an extruded monofilament of thermoplastic material around which is wound a reinforcing wire, a strip or ribbon or again a sheath or braid which is impregnated; the addition of a reinforcing wire indeed improves the resistance of the string to breakage on traction and reduces, under an equal constraint, the work rate and the flow; however, as a result of the relatively high extrusion temperatures, a shrinkage is produced which can disappear when the finished string is subjected to a constraint, which makes its characteristics less viable.

Most of the strings constituted at least partially of synthetic material which have been produced up till now give elongation curves as a function of traction which reveal an initial flow and, after a series of successive constraints, a permanent elongation, as well as a reduction of the reversible elongation; for all these reasons, strings or synthetic materials produced up till now have not been entirely satisfactory, in particular for stringing tennis rackets. In fact, even though the fabrication processes for strings, comprising at least one extrusion phase of thermoplastic material, notably allowing the manufacture of a monofilament or the impregnation of a strip of multifilaments in very advantageous conditions of continuity and speed for the economics of the operation, they have not however permitted strings to be made the quality of which has enabled them to be entered into competition with those made of animal gut, this essentially is a result of the particular limitations of thermoplastics materials and due to the thermal conditions under which they can be used.

The present invention allows strings made at least partially of synthetic materials to be made which have practically all the advantages of strings of animal gut on the one hand and of strings of synthetic material known up till now on the other hand, without however having their respective disadvantages which have been specified above.

The process according to the present invention to manufacture strings made at least partially of synthetic materials is characterised in that there is formed at least one bundle of multifilaments of synthetic or natural materials, parallel one to another, that the said bundle is impregnated with a thermosettable adhesive having an appropriate elasticity after hardening, that the impregnation product of the said bundle is made to prepolymerise up to a chosen degree of partial polymerisation, that the said bundle is then twisted while avoiding wringing its impregnated multifilaments dry, thanks to the degree of partial polymerisation chosen for this twisting, and that the polymerisation of the impregnation product is finally completed.

In a first mode of carrying out the process according to the present invention the bundle of multifilaments is impregnated by immersing them in a bath of impregnation product chosen in such a way as to be at ambient temperature a low viscosity liquid and, before making the product impregnating the bundle prepolymerise and twisting the bundle, the impregnated bundle is made to pass through a die of size chosen in order to eliminate the layer of impregnation product which surrounds the said bundle. As a result of this gauging of the impregnated bundle, before prepolymerisation of the impregnation product and twisting of the said bundle, the residual impregnation product is present only between the different multifilaments of the bundle, which in practice excludes the formation around the finished string of a sheath of polymerised impregnation product.

According to another mode of executing the process according to the present invention, after having twisted the impregnated bundle and before effecting the final polymerisation of the impregnation product, the bundle, impregnated and twisted is made to pass through a die of size chosen to let a continuous sheath of partially polymerised impregnation produce remain around the finished string having an appropriate thickness. This sheath has the advantage of protecting the outside of the multifilament of the bundle and thus of increasing its surface resistance to wear, which is appreciable for all the uses of the strings according to the present invention but in particular for tennis racket strings.

Different from the first mode of execution which consists in making the bundle of multifilaments pass through a die as soon as possible after its impregnation and before the prepolymerisation of the impregnation product, in such a way as to eliminate the exterior layer of impregnation product, the second mode of execution provides for making the bundle of multifilaments pass through a die only after partial prepolymerisation of the impregnation product and the twisting which immediately follows it, the size of this die being additionally chosen in such a fashion as to allow a certain layer of impregnation product to remain around the twisted bundle which, after completing the polymerisation of the impregnation product will form, around the finished string, a continuous sheath having an appropriate thickness.

According to the present invention the multifilaments of the bundle are constituted preferably of aliphatic polyamide, in particular one of types 6, 6—6, and 11, of polyester or of aromatic polyamide, in the increasing order of their elongation moduli, the selection being made according to the use envisaged.

The section, generally circular, and the number of multifilaments constituting the bundle are chosen as a function of the resistance to pulling which the string to be made should have. In order to promote impregnation of the multifilaments, their manufacturing twist, which can be of the order of 50 turns per meter, is preferably eliminated. In the case where the bundle is formed by assembling several elementary bundles, the manufacturing twist of each of the different elementary bundles should be removed before assembling them. In fact experience has shown that the impregnation of filaments or elementary bundles is better the more their residual twisting is reduced.

In order to carry out the manufacturing processes of strings according to the present invention an impregnation product should be chosen which has a viscosity sufficiently low perfectly to wet the multifilaments of the bundle, in particular at ambient temperature, and which after hardening adheres perfectly to the multifilaments while at the same time having the following advantageous characteristics: total elastic return (i.e. without hysteresis) and which is rapid; a coefficient of elongation at least equal to that of the multifilaments of the bundle.

In order to satisfy all of these conditions, the impregnation product for putting the process according to the present invention into practice is preferably formed by a polyurethane, an epoxide or a mixture of a polyurethane and an epoxide, optionally with an addition of amino silanes, increasing their adhesiveness and/or of cyanoacrylates, hardening in the air.

The impregnation of a bundle of multifilaments cannot take place with a thermoplastic product for it requires a product of low viscosity and as a result an elevated impregnation temperature, which would promote the melting of the multifilaments; at lower temperatures, it would not be possible to obtain impregnation to the heart of the bundle but only coating thereof; in these conditions, the subsequent twisting of the bundle would not be able to lead to the adherence of its turns one to another. It is not the same in the case where a bundle of multifilaments is impregnated according to the present invention with a thermosetting impregnation product having at ambient temperature the form of a liquid of low viscosity; in this latter case in effect if the impregnated bundle is twisted before the impregnation product has achieved an appropriate degree of partial polymerisation, almost the whole of the said impregnation product will be eliminated by the squeezing out which the twisting of the said bundle produces. This is why according to to the present invention the impregnation product of the bundle is made to prepolymerise up to an appropriate degree of partial polymerisation before proceeding with twisting in such a fashion as to avoid the squeezing dry of its impregnated multifilaments thanks to the degree of partial polymerisation chosen for this twisting up. There results from this that the percentage by weight of the product impregnating the bundle of multifilaments remains practically constant during carrying out of the manufacturing process according to the present invention, this percentage depending only on the viscosity that the impregnation product, partially polymerised, has at the moment of twisting up the impregnated bundle. Preferably the degree of partial polymerisation of the impregnating product for the bundle, at which the said bundle is twisted, is chosen in such a fashion that the said impregnation product then has a viscosity at least equal to 800 poise and optionally as high as 3000 poise; in these conditions, one in practice avoids any elimination of the impregnation product outside the bundle during the twisting of the latter without this adversely affecting the adherence of the turns formed in the final string.

It is known that certain filaments have a shrinkage when they are heated which depends on the maximum temperature achieved. Thus filaments of aliphatic polyamide of type 6 or of type 6—6, heated to 200° C., can have a shrinkage of 19%. This shrinkage which is reversible when the filament is then subjected to a traction gives strings comprising such filaments properties of elongation and elastic return which vary in the course of time, when such strings are subjected to repeated tractions, as is the case in tennis racket strings. In order to eliminate this disadvantage, which is particularly serious for all the applications of the strings in question, according to the present invention the impregnation product is chosen in such a way as to have a polymerisation temperature at which the multifilaments of the bundle undergo practically negligible shrinkage. In particular the impregnation product is chosen in such a way as to have a polymerisation temperature not greater than 110° C.; in effect at this temperature a filament of aromatic polyamide of type 6 for example has a shrinkage of 5%, which can be considered as acceptable for the applications envisaged.

The present invention likewise covers the strings made by the process which has just been described.

The strings made according to the first mode of execution indicated above of the process according to the present invention have the following structure: a bundle of multifilaments of synthetic or natural material impregnated to its heart with a thermoset adhesive having an appropriate elasticity, the said bundle being twisted and its turns being stuck one to another by the said thermoset adhesive.

The strings made according to the second mode of execution indicated above of the process according to the present invention has a structure which differs from the preceding one by the fact that the twisted bundle is surrounded by a continuous sheath of appropriate thickness constituted by the same thermoset adhesive as impregnates the said bundle. Thanks to their structure the strings made by the process according to the present invention have a better resistance to repeated traction than strings of synthetic material which have been known heretofore of the types indicated above.

As Examples there are described below several ways of putting the manufacturing process of strings according to the present invention into effect.

EXAMPLE 1

Polyester filaments are used each of 1100 decitex and constituted by 200 parallel filaments. With nine parallel filaments of this type a bundle of multifilaments of 9900 decitex is made; such a bundle has a strength of 69 g/tex and an elongation at break of 7.8%. This bundle is impregnated with a polyurethane elastomer which at ambient temperature is a liquid having a low visocity of about 20 poise and which is suseptible of gelling in 25 minutes per 100 g. This polyurethane is chosen to have after complete polymerisation a shore hardness $D = 65$. The impregnation is carried out at a rate of 50 parts polyurethane per 50 parts filament i.e. around 50% by weight of the impregnation product. This impregnation preferably takes place by passing the bundle of multifilaments in continuous fashion into a bath containing the polyurethane elastomer which is liquid at ambient temperature and making the impregnated bundle emerging from out of this bath cross a die set in its corresponding wall and of size chosen in such a fashion as to eliminate the layer of polyurethane elastomer which surrounds the bundle of multifilaments without however producing squeezing out of the latter; on emerging from the bath the bundle of multifilaments is then impregnated to its heart by the polyurethane elastomer but it is not surrounded on its outside by a layer of polyurethane elastomer. Then the polyurethane impregnating the bundle and emerged from the bath is allowed to prepolymerise at 20° C. i.e. practically at ambient temperature for about 90 minutes. When the chosen degree of partial polymerisation is achieved, the bundle is twisted, for example under a tension of 5 kg and at a rate of 150 turns per meter of its initial length. The completion of the polymerisation of the polyurethane which still impregnates the wound bundle is then effected; this final phase of polymerisation can comprise for example a first stage of 12 hours during which the string so made is simply subjected to a temperature of 20° C., then a second stage, for example of 3 hours, during which the string is subjected to a temperature of 95° C. The string made by the process which has just been described has a load at break of 64 kg and a shrinkage (relative to the length of impregnated and twisted bundle before final polymerisation had been carried out) which is only about 4.9%. Its diameter is about 1.5 mm.

EXAMPLE 2

There is used as multifilament bundle a polyamide thread of known type available under the commerical name "Kevlar", for example of 3500 denier; such a thread has a strength of 22 g/denier and an elongation at break of 1.9%. This thread is impregnated with an epoxy resin which at ambient temperature is a liquid susceptible to gelling in 15 minutes/100 g. This epoxy resin is chosen so as to have after complete polymerisation a Shore hardness $D = 75$ and an elongation at break of about 6%. The impregnation is carried out at a rate of 30 parts of epoxy resin per 70 parts of thread i.e. about 30% by weight of the impregnation product. This impregnation operation takes place for example as indicated above for Example 1. The epoxy resin impregnating the thread is then allowed to prepolymerise at ambient temperature during about 40 minutes. When the chosen degree of partial polymerisation is thus achieved, the thread is then twisted, for example under a tension of 2 kg and at a rate of 90 turns per meter of its initial length. the completion of the polymerisation of the epoxy resin which impregnates the thread is then carried out; this final phase of polymerisation can comprise for example a single stage of 8 days during which the string so formed is subjected simply to a temperature of 20° C., i.e. practically to ambient temperature. The string made by the process which has just been described has a load at break of 65 kg and a shrinkage (relative to the length of the impregnated and twisted thread before final polymerisation was carried out) which is less than 1%; its diameter is about 0.8 mm.

EXAMPLE 3

There is used as multifilament bundle a thread of aliphatic polyamide, in particular of type 6, for example of 7250 decitex; such a thread has a strength of 9.2 g/tex and an elongation at break of 17%. This thread is impregnated with a polyurethane elastomer which at ambient temperature is a liquid having a low viscosity of about 37.5 poise and which is susceptible of gelling in 6 minutes/100 g. This polyurethane is chosen in such a fashion as to have after complete polymerisation a Shore hardeness $D = 55$. The impregnation is carried out a rate of 44 parts of resin per 66 parts of thread i.e about 40% by weight of the impregnation product. This impregnation operation takes place for example by making the thread mentioned above pass into a bath filled with polyurethane liquid at ambient temperature and making it emerge from this bath across a die set in its corresponding wall the size of this die being chosen as is specified above for Example 1. Then the polyurethane impregnating the thread emerging from the bath is allowed to prepolymerise at ambient temperature for about 35 minutes. When the chosen degree of partial polymerisation is achieved, the thread is wound, for example under a tension of 3 kg and at a rate of 210 turns per metre of its initial length. The completion of the polymerisation of the polyurethane which impregnates the thread is then carried out; this final phase of the polymerisation may comprise for example a first stage of 7 hours during which the string so produced is subjected simply to a temperature of 20° C., then a second stage of for example 48 hours during which the string is subjected to a temperature of 50° C. The string made by the process which has just been described has a breaking load of 54 kg and a shrinkage (relative to the length of the impregnated and twisted thread before the final polymerisation was carried out) which is only about 1.6%; its diameter is of the order of 1.2 mm.

EXAMPLE 4

There is used as multifilament bundle a thread of aliphatic polyamide, in particular of type 6 of for example 7250 decitex; such a thread has a strength of 9.2 g/tex and a elongation at break of 17%. This thread is impregnated with a polyurethane elastomer which at ambient temperature is a liquid having a low viscosity of about 37.5 poise and which is susceptible of gelling in 6 minutes/100 g. This polyurethane is chosen in such a fashion as to have after complete polymerisation a Shore hardness $D = 55$. The impregnation is effected at a rate of 100 parts by weight of polyurethane per 50 parts of thread i.e. about 66% by weight of the impregnation product. This impregnation operation takes places for example by making the thread mentioned above pass into a bath filled with polyurethane liquid at the ambient temperature. Then the polyurethane impregnating the thread emerging from the bath is allowed to prepolymerise at ambient temperature for about 35 minutes. When the chosen degree of partial polymerisation is achieved, the thread is twisted, for example under a tension of 3 kg and at a rate of 210 turns per meter of the initial length. According to the present invention, the thread, impregnated and twisted, is then made to pass through a die having, in the example in question, a diameter of 1.4 mm, which allows a homogeneous layer of partially polymerised polyurethane to remain around the impregnated and twisted thread having a thickness of about 0.1 mm. There then remain about 55 parts of thread per 45 parts of polyurethane. The completion of the polymerisation of the polyurethane which impregnates the thread and which forms around it a continuous layer is then effected. This final phase of the polymerisation may comprise for example a first stage of 7 hours during which the string so made is subjected only to a temperature of 20° C., then a second stage of for example 48 hours during which the said string is subjected to a temperature of 50° C. The complete polymerisation of the polyurethane constituting the layer which envelops the impregnated and twisted string on the ouside gives rise to the formation around the said string of a continuous sheath having a well determined thickness. The string made by the process which has just been described has a breaking load of 54 kg and a shrinkage (with respect to the length of the impregnated twisted thread before completion of the polymerisation has been carried out) which is only about 1.6%.

The strings made by the process according to the present invention and notably by its different ways of putting it into effect and which have just been described as examples have the following advantages: they have a low shrinkage, less than 5% in the Examples above. Their elastic return characteristics are notably better than those of strings made heretofore starting from animal gut or synthetic fibre; this results from comparative measures effected on three equal lengths each for example of 6.5 m, respectively of a string of animal gut of a diameter of around 1.2 mm, a string of synthetic fibre of a diameter of around 1.4 mm and a string according to the present invention made notably according to Example 3 described above; each of these three strings, fixed at one of its ends, was subjected at its other end to 20 successive pullings each equal to 20 kg each cycle of pulling and relaxing having a total duration of 2 seconds; at the end of the last cycle, an elongation of 18 cm was measured in the case of the animal gut string, of 20 to 33 cm in the case of the synthetic fibre string according to the type of string in question, and only of 16 cm in the case of the string according to the present invention. It is in addition notable that this last result is independent of the specimen of string considered.

Thus, as has already been indicated, strings according to the present invention can be used for example but not exclusively to make the stringing for tennis rackets. The playing qualities of rackets so strung are very high, both as regards the speed imparted to the balls as well as the service life of the stringing without appreciable loss of tension. In addition and surprisingly these rackets allow playing precision to be substantially raised as a result of the possiblity of giving the strings according to the present invention a high tension without substantially reducing their elasticity, while the product impregnating the said strings ensures a certain advantageous damping of their vibration.

The present invention is not limited to the embodiments and ways of putting it into effect described above; it comprises all their variants.

What I claim is:

1. A process of manufacturing strings constituted at least in part of synthetic material, said process comprising the following steps:
   (a) forming at least one bundle of multifilaments of material selected from the class consisting of synthetic and natural materials, the filaments being parallel one to another,
   (b) impregnating all the multifilaments of said bundle with a thermosettable adhesive impregnation product having an appropriate elasticity when hardened,
   (c) making said impregnation product prepolymerise up to a chosen degree of partial polymerisation,
   (d) twisting said bundle while avoiding the drying out of its impregnated multifilaments thanks to the partial degree of polymerisation chosen for this twisting step and
   (e) finally completing the polymerisation of said impregnation product to harden the same.

2. A process of manufacturing strings constituted at least partially of synthetic material, said process comprising the following steps:
   (a) forming at least one bundle of multifilaments in a material selected from the class consisting of synthetic and natural materials, the multifilaments being parallel one to another,
   (b) impregnating all the multifilaments of said bundle by immersing the said bundle in a bath of thermosetting adhesive impregnation product which is a liquid of low viscosity at ambient temperature and which has an appropriate elasticity when hardened, (c) passing said bundle through a die of predetermined size so that the coat of liquid impregnation product surrounding the said bundle is eliminated,
(d) making said impregnation product in said bundle prepolymerise up to a chosen degree of partial polymerisation,
(e) twisting said bundle while avoiding the drying out of the impregnated multifilaments thanks to the degree of partial polymerisation chosen for this twisting step, and
(f) finally completing the polymerisation of said impregnation product to harden the same.

3. A process for manufacturing strings constituted at least in part of synthetic material, said process comprising the following steps:
(a) forming at least one bundle of multifilaments in a material selected from the class consisting of synthetic and natural materials, the multifilaments being parallel one to another,
(b) impregnating all the multifilaments of said bundle with a thermosettable adhesive impregnation product having an appropriate elasticity when hardened,
(c) making the impregnation product in said bundle prepolymerise up to a chosen degree of partial polyermisation,
(d) twisting said bundle while avoiding the drying out of its impregnated multifilaments thanks to the degree of partial polymerisation chosen for this twisting step,
(e) passing said impregnated and twisted bundle through a die of predetermined size so that a continuous sheath of impregnation product of predetermined thickness is retained around the said bundle, and
(f) finally completing the polymerisation of said impregnation product to harden the same.

4. The proces of claim 1 in which the multifilaments of the bundle are selected from the group consisting of aliphatic polyamides, polyesters and aromatic polyamides.

5. The process of claim 1 in which the multifilaments of the bundle are of glass.

6. The process of claim 1 in which the impregnation product is selected from the class consisting of polyurethanes nd epoxides.

7. The process of claim 1 in which the impregnation product is a mixture of a polyurethane and an epoxide.

8. The process of claim 1 in which the impregnation product includes an aminosilane.

9. The process of claim 1 in which the impregnation product includes a cyanoacrylate.

10. The process of claim 1 in which the percentage by weight of product impregnating the bundle of multifilaments lies between 30 and 65%.

11. The process of claim 1 in which the degree of partial polymerisation of the product impregnating the bundle at which the said bundle is twisted is chosen so that the said impregnation product has at that stage a viscosity at least equal to 800 poise.

12. The process of claim 1 in which the impregnation product is chosen to have a polymerisation temperature such that the multifilaments of the bundle undergo practically negligible shrinkage.

13. The process of claim 12 in which the impregnation product is chosen with a polymerisation temperature not greater than 110° C.

14. The process of claim 1 in which a multifilament bundle of aliphatic polyamide is subjected to twisting at a rate of 150 to 250 turns per meter of the intial length of the said bundle.

* * * * *